United States Patent Office 3,810,894
Patented May 14, 1974

---

3,810,894
DERIVATIVES OF PYRAZOLO[1,5-c]PYRIMIDINES AND PROCESS FOR THEIR PREPARATION
Eckart Kranz, Wuppertal-Elberfeld, and Marianne Bock, deceased, late of Wuppertal-Elberfeld, by Hermann Bock, executor, Bielefeld, Germany, assignors to Bayer Aktiengesellschaft, Leverkusen, Germany
No Drawing. Filed Nov. 24, 1971, Ser. No. 201,987
Claims priority, application Germany, Nov. 27, 1970, P 20 58 501.7
Int. Cl. C07d 51/46
U.S. Cl. 260—256.4 F     24 Claims

ABSTRACT OF THE DISCLOSURE

Derivations of pyrazolo[1,5-c]pyrimidines, which is a new heterocyclic nucleus, possess antimicrobial activity, particularly trichomonacidal and amoebicidal action. They are prepared from a β-triketone and a semicarbazide, thiosemicarbazide or aminoguanidine. A typical embodiment is 6H - 7 - thiono - 2,5-dimethyl pyrazolo[1,5-c] pyrimidine.

DETAILED DESCRIPTION

The present invention relates to certain N-bridged heteocyclic compounds possessing chemotherapeutic properties and useful as chemical intermediates and to processes for their production.

In particular, this invention pertains to derivatives of pyrazolo[1,5-c]pyrimidines, the fundamental nucleus of which represents a new heterocyclic system.

Although a derivative of pyrazolo[1,5-c]pyrimidine is listed in the ring index [RJ, 11,858 (1962–63)], it is apparently an erroneous description since an examination of the literature reference quoted, CA, 58:10214a; Pat. JA 2,347, May 21, 1962, reveals the compound actually prepared was a derivative of pyrazolo[1,5-a]pyrimidine. Pyrazolo[1,5-a]pyrimidines are generally known; e.g. Von Meyer, J. Prakt. Chem., 52, 81–117 (1895); Von Meyer et al., J. Prakt. Chem., 92, 185–193 (1915), and are accessible through the reaction of 5-aminopyrazoles and 1-dialkoxymethylalkylnitriles or 1-alkoxymethylene-alkylnitriles, CA, 58:10214a. The pyrazolo[1,5-c]pyrimidines of the present invention however cannot be manufactured analogously.

The present invention provides pyrazolo[1,5-c]pyrimidine of the formulas:

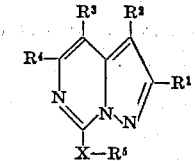

(I-A)

and

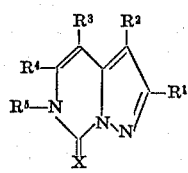

(I-B)

wherein $R^1$ and $R^4$ when taken independently are each selected from the group consisting of hydrogen, lower alkyl, pyridyl, pyrazolyl, imidazolyl, phenyl or phenyl substituted by halogeno, nitro, lower alkyl, lower alkoxy or lower alkylthio;

$R^2$ and $R^3$ when taken independently are each selected from the group consisting of hydrogen and lower alkyl;

$R^1$ and $R^2$ when taken together are alkylene of 2 to 4 carbon atoms;

$R^2$ and $R^3$ when taken together are alkylene of 2 to 4 carbon atoms;

$R^5$ when taken independently is selected from the group consisting of hydrogen and lower alkyl;

X when taken independently is oxygen, sulfur or imino; and $R^5$ and X when taken together are alkyleneimino of 2 to 4 carbon atoms or the group

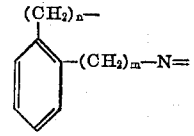

in which n and m, independent of the other, is zero or 1; and the non-toxic alkali metal, ammonia and organic amine salts thereof.

By the term lower alkyl is intended a straight or branched chain monovalent saturated hydrocarbon unit of from 1 to 6 carbon atoms such as methyl, ethyl, propyl, isopropyl, butyl, isobutyl, sec butyl, tert. butyl, pentyl and hexyl. Preferably such units contain 1 to 4 carbon atoms. Lower alkoxy refers to such groups bound to the remainder of the molecule through an ethereal oxygen atom, such as methoxy, ethoxy, propoxy, isopropoxy and the like. Lower alkylthio refers analogously to such lower alkyl groups bound through a sulfur atom such as methylthio, ethylthio, propylthio, isopropylthio and the like.

When $R^5$ is hydrogen, the two formulas above correspond to tautomeric forms of these compounds. When $R^5$ is other than hydrogen, two isomeric forms of the product are possible.

The invention also provides a process for the production of these compounds in which a β-triketone of the general formula

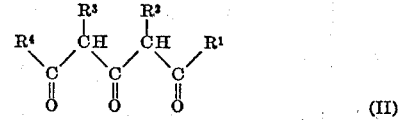

(II)

in which $R^1$, $R^2$, $R^3$ and $R^4$ have the above-mentioned meanings, is reacted with a hydrazine derivative of the general formula

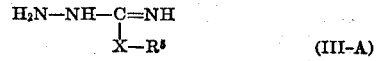

(III-A)

or

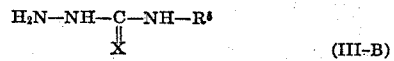

(III-B)

in which X and $R^5$ have the above-mentioned meanings, or a mineral acid salt thereof, in an aqueous, organic, or aqueous-organic medium, at a temperature from 0° C. to 150° C.

When $R^5$ is hydrogen, Formulas III–A and III–B correspond to tautomeric forms of the same compound. Similarly when X is imino, regardless of the nature of $R^5$, two tautomeric forms are present which, when $R^5$ is other than hydrogen leads to the two isomeric forms of the final compound. When X is oxygen or sulfur and $R^5$ is other than hydrogen, the compounds of Formulas III–A and III–B correspond to distinct isomers.

It may be observed that the formation of pyrazolo [1,5-c]pyrimidines by means of the above reaction is rather surprising. In view of the prior art, it would thus be expected that a reaction would take place analogous to that between β-triketones and hydrazine derivatives in forming N-amino-pyridones. (See, e.g. Bedekar et al., J. Indian. Chem. Soc., 12 (1935), 465–469.)

If 2,4,6-heptanetrione and aminoguanidine hydrochloride are used as the starting substances, the course of the present reaction can be represented in the specific by the following equation:

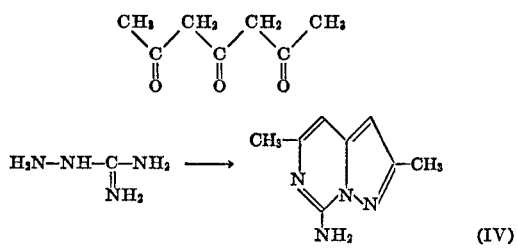

The β-triketones (II) employed as starting substances can be obtained by subjecting a 3-acyl-6-alkyl-4-hydroxypyrone-2 to acyl-lactone rearrangement with concentrated hydrochloric acid and converting the γ-pyrone thereby formed into the barium salt of the β-triketone by means of barium hydroxide, from which the keto compounds is easily liberated; see e.g. J. R. Bethell and P. Maithland, J. Chem. Soc. (1962), 3751–3758. Alternatively a di-lithium, di-sodium or dipotassium-β-diketones containing terminal methyl group is acylated by means of aliphatic, aromatic or heteroaromatic esters; see e.g., Light et al., J. Org. Chem. 25, 538–546 (1960); Work et al., J. Org. Chem., 28, 725–730 (1963); Miles et al., J. Org. Chem., 30, 1007–1011 (1965). As a third alternative, an enamine of an aliphatic or cycloaliphatic ketones is allowed to react with an acid chloride in a molar ratio of 1:2 in the presence of triethylamine; see e.g., German Pat. No. 1,070,-163.

Examples of the β-triketones (II) which can be used according to the invention include:

2,4,6-heptanetrione,
2,4,6-octanetrione,
2,4,6-nonanetrione,
1,1-dimethyl-2,4,6-heptanetrione,
2,4,6-decanetrione,
8-methyl-2,4,6-nonanetrione,
1,1,1-trimethyl-2,4,6-heptanetrione,
1-phenyl-1,3,5-hexanetrione,
1-phenyl-2-methyl-1,3,5-hexanetrione,
1-(4-chlorophenyl)-1,3,5-hexanetrione,
1-(4-methoxy)-1,3,5-hexanetrione,
1-(2-chlorophenyl)-1,3,5-hexanetrione,
1-(2,6-dichlorophenyl)-1,3,5-hexanetrione,
1-(2,4-dichlorophenyl)-1,3,5-hexanetrione,
1-(3-nitrophenyl)-1,3,5-hexanetrione,
1-(2-methylphenyl)-1,3,5-hexanetrione,
1-(2,6-dimethylphenyl)-1,3,5-hexanetrione,
1-phenyl-1,3,5-heptanetrione,
1-phenyl-1,3,5-octanetrione,
1-phenyl-1,3,5-nonanetrione,
1-phenyl-6-methyl-1,3,5-heptanetrione,
1-phenyl-7,7-dimethyl-1,3,5-heptanetrione,
1-(4-chlorophenyl)-1,3,5-heptanetrione,
1-(4-chlorophenyl)-1,3,5-octanetrione,
1-(4-chlorophenyl)-1,3,5-nonanetrione,
1-(4-methoxyphenyl)-1,3,5-heptanetrione,
1-(4-methoxyphenyl)-1,3,5-octanetrione,
1-(4-methoxyphenyl)-1,3,5-nonanetrione,
1-(4-chlorophenyl)-6-methyl-1,3,5-heptanetrione,
1-(4-chlorophenyl)-7,7-dimethyl-1,3,5-heptanetrione,
1-(4-methoxyphenyl)-6-methyl-1,3,5-heptanetrione,
1-(4-methoxyphenyl)-7,7-dimethyl-1,3,5-heptanetrione,
1-(3-pyridyl)-1,3,5-hexanetrione,
1-(3-pyridyl)-1,3,5-heptanetrione,
1-(3-pyridyl)-1,3,5-octanetrione,
1-(3-pyridyl)-1,3,5-nonanetrione,
1-(3-pyridyl)-6-methyl-1,3,5-heptanetrione,
1-(4-imidazolyl)-1,3,5-hexanetrione,
1-(3-pyrazolyl)-1,3,5-hexanetrione,
1,6-diphenyl-1,3,5-pentanetrione,
1,6-di-(4-chlorophenyl)-1,3,5-pentanetrione,
1,6-di-(2-chlorophenyl)-1,3,5-pentanetrione,
1,6-di-(4-methoxyphenyl)-1,3,5-pentanetrione,
1,6-di-(2,4-dichlorophenyl)-1,3,5-pentanetrione,
1,6-di-(2,6-dimethylphenyl)-1,3,5-pentanetrione,
1-phenyl-6-(3-pyridyl)-1,3,5-pentanetrione,
1-phenyl-6-(4-imidazolyl)-1,3,5-pentanetrione,
1-phenyl-6-(3-pyrazolyl)-1,3,5-pentanetrione,
1-(2-oxocyclohexyl)-1,3-butanedione,
1-(2-oxocyclopentyl)-1,3-butanedione,
1-(2-oxocycloheptyl)-1,3-butanedione,
1-(2-oxocyclohexyl)-3-phenyl-1,3-propanedione,
1-(4-methoxyphenyl)-3-(2-oxocyclohexyl)-1,3-propanedione,
1-(4-chlorophenyl)-3-(2-oxocyclohexyl)-1,3-propanedione,
1-(4-methoxyphenyl)-3-(2-oxocyclopentyl)-1,3-propanedione,
1-(4-chlorophenyl)-3-(2-oxocycloheptyl)-1,3-propanedione,
2,6-diacetyl-cyclohexan-1-one,
2,6-dipropionyl-cyclohexan-1-one,
2,6-dibuturyl-cyclohexan-1-one,
2,6-diisopropionyl-cyclohexan-1-one,
2,6-diisobuturyl-cyclohexan-1-one,
2,6-dibenzoyl-cyclohexan-1-one,
2,6-diacetyl-cyclopentan-1-one,
2,6-dipropionyl-cyclopentan-1-one,
2,6-diisopropionyl-cyclopentan-1-one,
2,6-dibuturyl-cyclopentan-1-one,
2,6-dibenzoyl-cyclopentan-1-one,
2,6-diacetyl-cycloheptan-1-one,
2,6-dipropionyl-cycloheptan-1-one,
2,6-diisopropionyl-cycloheptan-1-one,
2,6-dibuturyl-cycloheptan-1-one,
2,6-dibenzoyl-cycloheptan-1-one, and
2,6-di-(3-pyridyl)-cyclohexan-1-one.

The hydrazine derivatives (III) used as the second reactant are known or can be prepared by known processes. Typical of this reactant are thiosemicarbazide, semicarbazide, aminoguanidine, 2-hydrazino-imidazoline, 2-hydrazino-imidazole, 2-hydrazino-3,4,5,6-tetrahydro-pyrimidine, 2-hydrazinobenzimidazole, 2 - hydrazino - 4,5,6,7-tetrahydro-1H-1,3-diazepine, 3-hydrazino - 4,5 - dihydro-1H-2,4-benzdiazepine and 2 - hydrazino-3,4-dihydroquinazoline, and their chloride, carbonate, nitrate and sulfate salts.

Water is preferably used as the reaction medium. Organic solvents such as dioxane, dimethylformamide, dimethylsulfoxide and alcohols, as well as dilute acid solutions or mixtures of water and organic solvents, can be used. The reaction is performed at temperatures in the range of from about 0° C. to about 150° C., preferably at approximately 100° C., as a rule, at normal pressures. It is generally adequate to employ about 1 mol of β-triketone in 1 litre of water for each mol of hydrazine compound.

The products are colorless, crystalline substances which in most cases precipitate in a crystalline form during the course of or at the completion of the reaction.

The pyrazolo[1,5-c]pyrimidines of the invention possess chemotherapeutic activity. The 7-thiono-pyrazolo-[1,5-c]pyrimidines in particular show very good trichomonacidal and amoebicidal action. This can be conveniently observed in vitro models, of which the following are typical.

Tests on Trichomonas vaginalis were carried out with a strain isolated from material from a patient, the strain having been maintained since 1957 in culture passages in a digestion broth.

Collected material from cultures incubated for 48 hours was used. The solid component of the nutrient, prepared beforehand in test-tubes, was covered with 4.5 cm.³ of nutrient solution containing trichomonades, to which solution 0.5 cm.³ of the appropriately diluted test substance was in each case added. The cultures were incubated at 37° C. for 48 hours. The growth of the excitant was microscopically examined to determine trichomonacidal action.

The effect of dysentery amoebae was determined with a strain isolated from humans in the Hamburg Tropical Institute. This strain of *Entamoeba histolytica* was grown in cultures with mixed bacterial flora or in bacteria-free culture with *Trypanoma cruzi* as the concomitant organisms. The in vitro tests were carried out in accordance with the method indicated above for *Trichomonas vaginalis*.

The activity of two compounds is shown together with that of 1-(hydroxyethyl)-2-methyl-5-nitroimidazole, for comparison.

| Compound | Protozoa | Concentration Action | Trace action |
|---|---|---|---|
| 1-(hydroxyethyl)-2-methyl-5-nitroimidazole. | Trichom. vagin. Entam. histol. | $10^{-3}$ to $10^{-3.5}$ $10^{-3}$ to $10^{-4.5}$ | $10^{-4}$ $10^{-5}$ |
| 6H-7-thiono-2,5-dimethyl-pyrazolo[1,5-c]pyrimidine. | Trichom. vagin. Entam. histol. | $10^{-3}$ to $10^{-8.5}$ | $10^{-7}$ |
| 6H-7-yhiono-2-methyl-5-isopropylpyrazolo[1,5-c]pyrimidine. | Trichom. vagin. Entam. histol. | $10^{-3}$ to $10^{-6}$ $10^{-3}$ to $10^{-4}$ | |

The pyrazolo[1,5-c]pyrimidines of this invention can be administered in doses of from 0.01 to 0.1 mg./kg. of body weight for the local treatment of trichomoniasis. They can furthermore be added in concentrations of $10^{-6}$ to $10^{-5}$ g./litre for disinfecting bath water such as in public baths.

The chemotherapeutic agents can either be employed as such, in suspension, or in the form of their salts, for example water-soluble salts, especially alkali metal, alkaline earth metal, ammonium, and organic amine salts such as dialkylamine, alkanolamine and the like.

Pharmaceutical compositions are thus provided containing, as an active ingredient, at least one of the pyrazolo[1,5-c]pyrimidines of the invention, or a non-toxic salt thereof, in admixture with a pharmaceutically acceptably solid or liquid diluent or carrier as hereinafter defined. Suitable pharmaceutical compositions include ointments, pastes, creams, sprays, lotions, aqueous suspensions, elixirs, syrups, granules, powders, either free-flowing or compressed into tablets, and the like.

The expression "pharmaceutically acceptable diluent or carrier" denotes a non-toxic substance that when mixed with the active ingredient or ingredients renders it suitable for administration. Examples of liquid diluents and carriers include water, vegetable oils, polyols, buffered aqueous solutions, isotonic saline aqueous solutions, syrups and lotion bases, while examples of solid diluents and carriers include starches, cellulose and its derivatives, sugars, stearates and stearic acid, talc, and ointment bases.

The pharmaceutical compositions of the invention can also contain other non-toxic adjuvants and modifiers such as dyes, surfactants, perfumes, preservatives and biocides.

The pharmaceutical compositions of the invention preferably contain 0.1 to 95% by weight of the pyrazolo[1,5-c]pyrimidine or a non-toxic salt thereof.

The compositions are often advantageously formulated in dosage unit form, comprising as an active ingredient at least one pyrazolo[1,5-c]pyrimidine of the Formula I or a non-toxic salt thereof, alone or in admixture with a pharmaceutically acceptable solid or liquid diluent or carrier. The expression "dosage unit form" refers to compositions of discrete portions, each containing a unit dose or a multiple or sub-multiple of a unit of the pyrazolo[1,5-c]pyrimidine, for example, one, two, three or four unit doses or a half, a third or a quarter of a unit dose. A "unit dose" is the amount of the pyrazolo[1,5-c]pyrimidine to be administered on one occasion and will usually be a daily dose, or for example a half, a third, or a quarter of a daily dose, depending on whether the medicament is to be administered once or, for example, twice, three times, or four times a day, respectively.

The composition in dosage unit form can include a protective envelope with the active ingredient undiluted and contained in such an envelope, or can be mixed with a pharmaceutically acceptable solid or liquid diluent or carrier as defined above. Such portions can be in monolithic coherent form, such as tablets, lozenges, pills, suppositories, or dragées; in wrapped or concealed form, the active ingredients being within a protective envelope, such as wrapped powders, cachets, sachets, capsules, or ampoules; or in the form of a sterile solution suitable for parenteral injection, such as ampoules of buffered, isotonic, sterile, pyrogen-free aqueous solution; or in any other form known in the art.

The compounds and their preparation are further typified by the following examples.

EXAMPLE 1

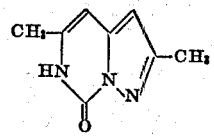

222 g. (2 mols) of semicarbazide hydrochloride are dissolved in 2 litres of water. A saturated aqueous solution of 106 g. (1 mol) of sodium carbonate is added thereto, immediately followed by 284 g. (2 mols) of diacetylacetone. The reaction mixture is now warmed to 100° C. for 6 hours, whereupon a clear solution is produced. After completion of the reaction, the mixture is concentrated to approximately 200 ml., and the precipitate is filtered off and washed with a little ice-cold water. Recrystallization from ethanol is effected, to yield 6H-7-keto-2,5-dimethyl-pyrazolo[1,5-c]pyrimidine. Yield: 196.3 g. (60.2% of theory). Melting point 209–210° C. (ethanol).

EXAMPLE 2

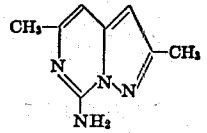

5.5 g. (0.05 mol) of aminoguanidine hydrochloride are dissolved in 50 ml. of water. 7.1 g. (0.05 mol) of diacetylacetone are added thereto and the reaction mixture is heated overnight to 100° C. After cooling, normal sodium hydroxide solution is added until the mixture reacts alkaline, in order to liberate the amino compound. The precipitate is filtered off, washed with water and recrystallized from ethanol to yield 7-amino-2,5-dimethyl-pyrazolo[1,5-c]pyrimidine. Yield: 7.2 g. (89% of theory). Melting point 185–186° C. (ethanol).

The compounds of the following examples are produced by methods analogous to those of Examples 1 and 2 from the following starting materials.

| Example | Hydrazine | β-Triketone |
|---|---|---|
| 3 | Thiosemicarbazide | Diacetylacetone. |
| 4 | do | 1-phenyl-1,3,5-hexatrione. |
| 5 | Aminoguanidine | Do. |
| 6 | Semicarbazide | Do. |
| 7 | Aminoguanidine | 2,4,6-octatrione. |
| 8 | do | 2,4,6-nonatrione. |
| 9 | do | 7-methyl-2,4,6-octatrione. |
| 10 | Thiosemicarbazide | Do. |
| 11 | Aminoguanidine | 3,5,7-nonatrione. |
| 12 | Methylaminoguanidine | Diacetylacetone. |
| 13 | do | Do. |
| 14 | Methylsemicarbazide | Do. |
| 15 | Methylthiosemicarbazide | Do. |
| 16 | do | Do. |
| 17 | 2-hydrazinoimidazoline | Do. |
| 18 | do | 1-phenyl-1,3,5-hexatrione. |
| 19 | 2-hydrazino-3,4,5,6-tetrahydropyrimidine. | Diacetylacetone. |
| 20 | 2-hydrazinobenzimidazole | Do. |
| 21 | Aminoguanidine | 2,6-dipropionylcyclohexan-1-one. |

Thus obtained are

EXAMPLE 3

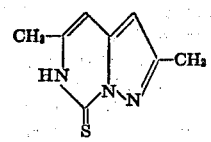

6H-7-thiono - 2,5 - dimethyl - pyrazolo[1,5-c]pyrimidine. Melting point 217–218° C. (ethanol).

EXAMPLE 4

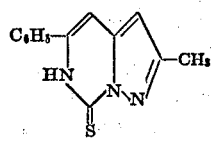

6H-7-thiono-2-methyl - 5 - phenyl-pyrazolo[1,5-c]pyrimidine. Melting point 212–214° C. (ethanol).

EXAMPLE 5

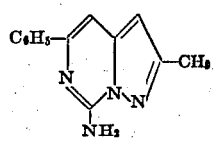

7-amino - 2 - methyl-5-phenyl-pyrazolo[1,5-c]pyrimidine. Melting point 288–290° C. (ethanol).

EXAMPLE 6

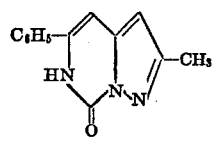

6H-7-keto - 2 - methyl-5-phenyl-pyrazolo[1,5-c]pyrimidine. Melting point 264–265° C. (dioxane).

EXAMPLE 7

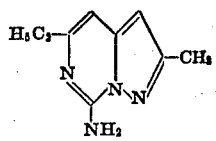

7-amino - 2 - methyl-5-ethyl-pyrazolo[1,5-c]pyrimidine. Melting point 135–136° C. (ethanol).

EXAMPLE 8

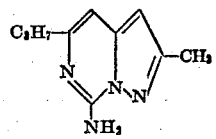

7-amino-2-methyl - 5 - propyl-pyrazolo[1,5-c]pyrimidine. Melting point 97–98° C. (aqueous ethanol).

EXAMPLE 9

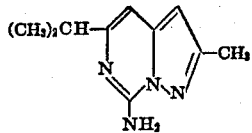

7-amino - 2 - methyl-5-isopropyl-pyrazolo[1,5-c]pyrimidine. Melting point 137–138° C. (ethanol).

EXAMPLE 10

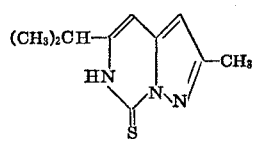

6H - 7 - thiono-2-methyl-5-isopropyl-pyrazolo[1,5-c]pyrimidine. Melting point 203–204° C. (benzene).

EXAMPLE 11

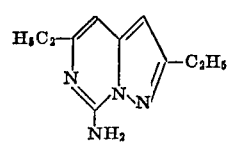

7-amino - 2,5 - diethyl-pyrazolo[1,5-c]pyrimidine. 126–128° C. (cyclohexane).

EXAMPLE 12

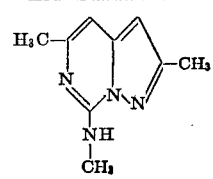

7-methylamino - 2,5 - dimethyl-pyrazolo[1,5-c]pyrimidine. Melting point 49° C. (petroleum ether).

EXAMPLE 13

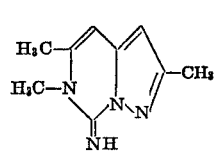

7 - imino-2,5,6-trimethyl-pyrazolo[1,5-c]pyrimidine. Melting point 147–148° C. (ether).

EXAMPLE 14

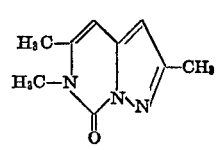

7 - keto-2,5,6-trimethyl-pyrazolo[1,5-c]pyrimidine. Melting point 163–164° C. (ethanol).

EXAMPLE 15

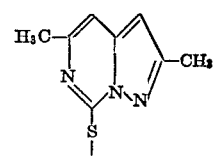

7-methylmercapto - 2,5 - dimethyl-pyrazolo[1,5-c]pyrimidine. Melting point 100–101° C. (ethanol).

EXAMPLE 16

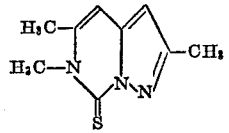

7-thiono-2,5,6-trimethyl-pyrazolo[1,5-c]pyrimidine. Melting point 127–128° C. (ethanol).

EXAMPLE 17

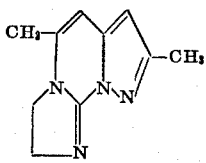

2,5 - dimethyl - 7,8 - dihydro-imidazolo[1,2-a]pyrazolo [1,5-c]pyrimidine. Melting point 226–227° C. (ligroin/ethanol).

EXAMPLE 18

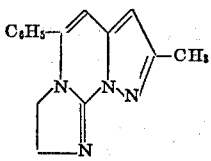

2-methyl-5-phenyl - 7,8 - dihydro-imidazo[1,2-a]pyrazolo [1,5-c]pyrimidine. Melting point 186–187° C. (ethyl acetate).

EXAMPLE 19

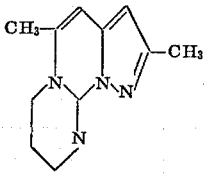

2,5-dimethyl - 8,9 - dihydro-7H-pyrazolo[1,5-c]pyrimido [1,2-a]pyrimidine. Melting point 117–118° C. (cyclohexane).

EXAMPLE 20

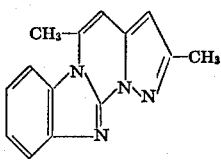

2,5 - dimethyl-pyrazolo[1',5':3,4]pyrimido[1,2 - a]benzimidazole. Melting point 184–185° C. (aqueous ethanol).

EXAMPLE 21

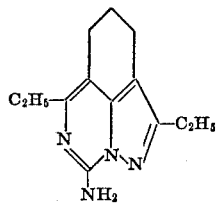

7-amino-2,5-diethyl - 3,4 - trimethylene-pyrazolo[1,5-c] pyrimidine. Melting point 160–161° C. (ethanol).

What is claimed is:

1. A compound selected from the group consisting of a pyrazolo[1,5-c]pyrimidine of the formulas:

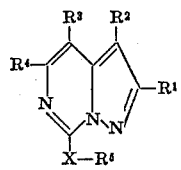

(I-A)

and

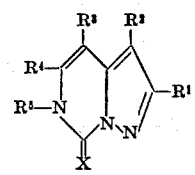

(I-B)

wherein
each of $R^1$ and $R^4$, when taken independently, is lower alkyl or phenyl;
each of $R^2$ and $R^3$, when taken independently, is hydrogen; or $R^2$ and $R^3$ when taken together are alkylene of 2 to 4 carbon atoms;
$R^5$ when taken independently is selected from the group consisting of hydrogen and lower alkyl;
X, when taken independently is oxygen, sulfur or imino; and
$R^5$ and X when taken together are alkyleneimino of 2 to 4 carbon atoms or the group

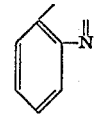

and the nontoxic alkali metal, ammonia and organic amine salts thereof.

2. A compound according to claim 1 wherein
each of $R^1$ and $R^4$ is lower alkyl or phenyl,
each of $R^2$ and $R^3$ is hydrogen,
$R^5$ is hydrogen or lower alkyl, and
X is oxygen, sulfur or imino.

3. The compound according to claim 1 which is 6H-7-keto-2,5-dimethyl-pyrazolo[1,5-c]pyrimidine.

4. The compound according to claim 1 which is 6H-7-thiono-2,5-dimethyl-pyrazolo[1,5-c]pyrimidine.

5. The compound according to claim 1 which is 6H-7-thiono-2-methyl-5-phenyl-pyrazolo[1,5-c]pyramidine.

6. The compound according to claim 1 which is 7-amino-2-methyl-5-phenyl-pyrazolo[1,5-c]pyrimidine.

7. The compound according to claim 1 which is 6H-7-keto-2-methyl-5-phenyl-pyrazolo[1,5-c]pyrimidine.

8. The compound according to claim 1 which is 7-amino-2-methyl-5-ethyl-pyrazolo[1,5-c]pyrimidine.

9. The compound according to claim 1 which is 7-amino-2-methyl-5-propyl-pyrazolo[1,5-c]pyrimidine.

10. The compound according to claim 1 which is 7-amino-2-methyl-5-isopropyl-pyrazolo[1,5-c]pyrimidine.

11. The compound according to claim 1 which is 6H-7-thiono-2-methyl-5-isopropyl-pyrazolo[1,5-c]pyrimidine.

12. The compound according to claim 1 which is 7-amino-2,5-diethyl-pyrazolo[1,5-c]pyrimidine.

13. The compound according to claim 1 which is 7-methylamino-2,5-dimethyl-pyrazol[1,5-c]pyrimidine.

14. The compound according to claim 1 which is 7-imino-2,5,6-trimethyl-pyrazolo[1,5-c]pyrimidine.

15. The compound according to claim 1 which is 7-keto-2,5,6-trimethyl-pyrazolo[1,5-c]pyrimidine.

16. The compound according to claim 1 which is 7-methylmercapto-2,5-dimethyl-pyrazolo[1,5-c]pyrimidine.

17. The compound according to claim 1 which is 7-thiono-2,5,6-trimethyl-pyrazolo[1,5-c]pyrimidine.

18. The compound according to claim 1 which is 2,5-dimethyl-7,8-dihydro-imidazolo[1,2 - a]pyrazolo[1,5 - c] pyrimidine.

19. The compound according to claim 1 which is 2-methyl-5-phenyl-7,8 - dihydro - imidazo[1,2 - a]pyrazolo-[1,5-c]pyrimidine.

20. The compound according to claim 1 which is 2,5-dimethyl-8,9 - dihydro - 7H - pyrazolo[1,5 - c]pyrimido-[1,2-a]pyrimidine.

21. The compound according to claim 1 which is 2,5-dimethyl - pyrazolo[1',5':3,4]pyrimido[1,2 - a]benzimidazole.

22. The compound according to claim 1 which is 7-amino-2,5-diethyl - 3,4 - trimethylene - pyrazolo[1,5 - c]pyrimidine.

23. The compound according to claim 1 which is 7-amino-2,5-dimethyl-pyrazolo[1,5-c]pyrimidine.

24. Process for the preparation of a compound selected from the group consisting of a pyrazolo[1,5-c]pyrimidine of the formulas:

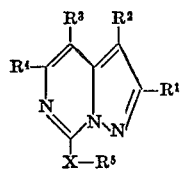

(I-A)

and

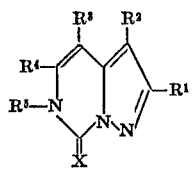

(I-B)

wherein
each of $R^1$ and $R^4$, when taken independently, is lower alkyl or phenyl;
each of $R^2$ and $R^3$, when taken independently, is hydrogen; or $R^2$ and $R^3$ when taken together are alkylene of 2 to 4 carbon atoms;
$R^5$ when taken independently is selected from the group consisting of hydrogen and lower alkyl;
X, when taken independently is oxygen, sulfur or imino; and $R^5$ and X when taken together are alkyleneimino of 2 to 4 carbon atoms or the group

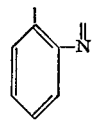

and the nontoxic alkali metal, ammonia and organic amine salts thereof, which comprises allowing a β-triketone of the formula

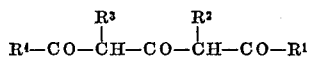

in which $R^1$, $R^2$, $R^3$ and $R^4$ are as herein defined to react with a hydrazine derivative of the formulas:

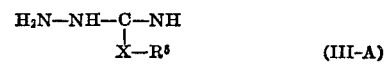

(III-A)

or

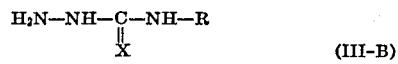

(III-B)

in which $R^5$ and X are as herein defined, or a mineral acid salt thereof, in an inert solvent at a temperature of from about 0 to about 150° C., whereby the reaction of hydrazine derivative (III-A) with the β-triketone produces Compound I-A and the reaction of hydrazine derivative (III-B) with the β-triketone produces Compound I-B.

References Cited
UNITED STATES PATENTS
3,621,025   11/1971   Jen et al. _____ 260—256.4 F DONALD G. DAUS, Primary Examiner R. V. RUSH, Assistant Examiner U.S. Cl. X.R.

260—256.5 R; 424—251